United States Patent [19]

Cetinkaya

[11] Patent Number: 4,881,592
[45] Date of Patent: Nov. 21, 1989

[54] HEAT EXCHANGER WITH BACKMIX AND FLOW THROUGH PARTICLE COOLING

[75] Inventor: Ismail B. Cetinkaya, Palatine, Ill.
[73] Assignee: UOP, Des Plaines, Ill.
[21] Appl. No.: 150,864
[22] Filed: Feb. 1, 1988
[51] Int. Cl.[4] ................... F28D 13/00; F28D 19/02
[52] U.S. Cl. ....................... 165/104.16; 165/104.18; 34/57 A; 422/144; 502/41
[58] Field of Search ................... 165/104.16, 104.18; 34/57 A; 422/144

[56] References Cited

U.S. PATENT DOCUMENTS

| | | | |
|---|---|---|---|
| 2,377,657 | 6/1945 | Watts | 196/52 |
| 2,492,948 | 1/1950 | Berger | 252/417 |
| 2,619,451 | 11/1952 | Ogorzaly et al. | 165/104.16 |
| 2,735,802 | 2/1956 | Jahnig | 196/52 |
| 2,862,798 | 12/1958 | McKinney | 23/288 |
| 2,970,117 | 1/1961 | Harper | 252/417 |
| 3,672,069 | 6/1972 | Reh et al. | 34/20 |
| 4,238,631 | 12/1980 | Daviduk et al. | 585/469 |
| 4,396,531 | 8/1983 | Lomas | 252/417 |
| 4,434,245 | 2/1984 | Lomas et al. | 502/2 |
| 4,439,533 | 3/1984 | Lomas et al. | 502/6 |
| 4,483,276 | 11/1984 | Lomas et al. | 165/104.16 |

Primary Examiner—Albert W. Davis, Jr.
Attorney, Agent, or Firm—Thomas K. McBride; John G. Tolomei

[57] ABSTRACT

A method and apparatus for cooling hot particulate material uses a heat exchanger zone having an upper portion that operates in a flow through mode and a lower part that operates in a back mix mode. Particulate material descends from a collection zone into an upper inlet of a heater exchanger. The exchanger contains a series of tubes for indirect heat exchange of the particulate material with a cooling fluid. Particulate material leaves the exchanger through an outlet located at a mid portion of the exchanger. The section of the exchanger between the inlet and outlet comprises the flow-through portion. Particulate material undergoes further heat exchange below the outlet of the exchanger in the backmix portion. Fluidizing gas that enters at the bottom of the exchanger provides the necessary turbulence for particle interchange on the backmix portion of the cooler as well as transport of the particulate material through the flow through portion of the exchanger. The method and exchanger design facilitates the addition of surface area to the exchanger and increases the heat removal duty in the backmix portion of the exchanger.

3 Claims, 2 Drawing Sheets

HEAT EXCHANGER WITH BACKMIX AND FLOW THROUGH PARTICLE COOLING

FIELD OF THE INVENTION

This invention relates to methods and heat exchangers for heating or cooling particulate material. More particularly, this invention relates to methods for heating or cooling hot particles by indirect heat exchange and heat exchangers for use therein.

BACKGROUND OF THE INVENTION

Heat exchangers for heating or cooling particulate comminuted or fine grade material by indirect contact with a heating or cooling fluid are well known. Heat exchangers of this type maintain the particulate material in a fluidized state with fluidizing medium that passes upwardly through a bed of the material. A series of conduits comprising tubes, channels or coils are positioned within the fluidized bed. A fluid passes through the conduits to add or remove heat from the fluidized solids by indirect heat exchange. Fluidized solids are continuously supplied to the fluidized bed and fluidized solids are continuously withdrawn from the bed. Methods of supplying or withdrawing solids from the bed through exchanger include flow through and backmix type exchangers. There are two basic versions of flow through coolers; one uses gravity feed wherein particulates enter an upper inlet and exit a lower outlet, and the other employs fluidized transport that moves particles from a lower inlet past the cooling conduits and out an upper outlet. In a backmix operation particles are circulated through a common inlet and outlet that exchanges particles with the rest of the process.

Heat exchangers for the indirect heating or cooling of particulate material have found widespread application in a number of industrial processes. These processes include treatment of mineral matter, the handling of metallurgical ores, the manufacture of petrochemicals and the conversion of hydrocarbons. A number of exchanger configurations have evolved to suit the needs of these different processes.

Indirect heat exchangers of the above-described type have been finding increasing use as particle coolers on the regenerators of processes for the fluidized catalytic conversion of hydrocarbons. The fluidized catalytic cracking process (hereinafter FCC) has been extensively relied upon for the conversion of hydrocarbon streams such as vacuum gas oils and other relatively heavy oils into lighter and more valuable products. In the FCC process, starting hydrocarbon material contacts a finely divided particulate catalyst which is fluidized by a gas or vapor. As the particulate material catalyzes the cracking reaction, a by-product of the cracking reaction referred to as coke is surface-deposited thereon. A regenerator, which is an integral part of the FCC process, continuously removes coke from the catalyst surface by oxidation. Oxidation of the coke releases a large amount of heat which in part supplies the heat input needed for the cracking reaction. As FCC units have been called upon to process heavier feeds, greater amounts of coke must be removed in the regeneration zone with a corresponding increase in the amount of heat generated therein. This additional heat poses a number of problems for the FCC process. The excess heat can upset the thermal balance of the process thereby requiring a lowering of the circulation of hot catalyst from the regenerator to the reactor which in turn can lower the yield of valuable products. In addition, the excess heat may raise temperatures to the point of damaging the equipment or catalyst particles. Therefore, it is advantageous to have a means of lowering the regenerator temperature. For reasons of temperature control and process flexibility, heat exchangers having cooling tubes located outside the regenerator vessel have become the method of choice.

An important consideration in the FCC process as well as other processes that involve the handling of particulate material is the transport of the particulate material. It is often difficult to incorporate a heat exchanger having the necessary dimensions to provide the desired degree of particulate heat transfer into the constraints of the process arrangement. In the main, these constraints involve obtaining sufficient exchanger length to accommodate the required surface area of the exchanger conduits and providing inlets and outlets for the movement of the particles between the exchanger and the rest of the process unit. In the case of an FCC process unit, addition of a particle heat exchanger may necessitate raising the entire structure, or the incorporation of extra conduits and fluidization devices in order to meet the exchanger design requirements. When the particle heat exchanger is added to a newly designed FCC unit, the increased elevation and/or added conduits and fluidization devices raise costs and complicate construction of the unit. It is also popular to retrofit particulate heat exchangers into existing FCC process units. In these cases, the structural constraints may not only add to the cost of the unit, but may not permit the incorporation of a particulate exchanger having the desired heat removal capacity.

The use of a backmix type exchanger, as previously mentioned, will simplify the incorporation of the particle heat exchanger into any process since it only requires the use of a single inlet/outlet conduit. However, the overall heat exchange capacity of this type of device is limited by the amount of catalyst circulation that can be obtained over its vertical length. Moreover, the overall heat transfer per length of cooling conduit available in the backmix cooler is lower than in the flow through type exchanger where catalyst flows from an inlet in one end of the heat exchanger to an outlet at the opposite end. Finally, an additional layout constraint of the backmix type cooler is its need for a very large inlet/outlet conduit in order to obtain adequate particle circulation between a retention, the heat exchanger and the region where the particles are withdrawn and retrieved. Therefore, a backmix type exchanger cannot overcome many of the layout problems associated with the incorporation of a remote particle heat exchanger into a process that requires heating or cooling of particulate material.

INFORMATION DISCLOSURE

U.S. Pat. No. 2,377,657 issued to G. W. Watts shows a process involving the transport of particulate material, comprising a catalyst for use in a fluidized catalytic cracking process, by gravity flow into an inlet located at one end of an elongated heat exchanger that cools the particles by indirect contact with water. The water passes through a series of conduits for the generation of steam. Cooled particles leave through an outlet located at an opposite end of the exchanger and are upwardly transported away from the outlet by a fluidizing medium. This reference is cited for its general showing of a particle heat exchanger having a gravity feed of particulate material.

U.S. Pat. No. 2,862,798 issued to McKinney teaches a process for cooling FCC catalyst particles wherein the particles are withdrawn from a regenerator by gravity flow and transported by a fluidizing medium upwardly through a particulate heat exchanger for indirect cooling with a cooling fluid. The fluidizing medium transports the catalyst upwardly to a cooler outlet and back to the regenerator. This reference shows the use of a fluidizing medium to transport particulate material through a heat exchanger.

U.S. Pat. No. 2,970,117 issued to Harper shows a particle heat exchanger that receives hot catalyst particles from an FCC regenerator through an upper inlet and empties the particles from a lower outlet into a riser conduit that uses a fluidizing gas to transport the cooled catalyst particles back to the regenerator. This reference shows the use of a fluidizing medium to transport cooled particulate material back to the vessel from which it was withdrawn.

U.S Pat. No. 3,672,069 issued to Reh et al. shows a backmix type fluidized bed heat exchanger where catalyst is mixed by a fluidizing gas in a series of compartments and transported across the top of the compartments. Each succeeding compartment has a lower elevation so that the particles gravitate to a final compartment from which the particulate material is withdrawn. Conduits within the compartments receive a heat exchange fluid for cooling or heating of the particulate material. This reference shows the generalized use of backmix type particle heat exchangers.

In U.S. Pat. No. 2,492,948 a heat exchanger for cooling particulate material receives FCC catalyst particles at its upper end through an outer annular area which carries the catalyst to the bottom of the heat exchanger where a fluidizing medium transports the catalyst upwardly through a series of conduits containing cooling fluid and ejects the catalyst back into the regenerator at a higher elevation than that from which it was withdrawn. This reference shows a particle heat exchanger having internal means for receiving and transporting catalyst through the device.

U.S. Pat. No. 4,439,533 issued to Lomas et al. depicts a particle heat exchanger of the backmix type that exchanges FCC catalysts between the heat exchanger and a catalyst particle retention zone in the regenerator. This reference shows the use of a backmix catalyst cooler in an FCC process.

U.S. Pat. No. 4,434,245 issued to Lomas et al. is directed to the use of a particle heat exchanger in an FCC process having a catalyst disengaging zone and a separate combustion zone. Hot catalyst particles are taken from the disengaging zone, transported downwardly through the cooler in indirect heat exchange with a cooling fluid and taken from the bottom of the heat exchanger to a lift riser for transport of the catalyst into the combustion zone. This reference shows the use of a particle heat exchanger in an FCC process having a lower combustion zone and an upper catalyst retention zone.

In U.S. Pat. No. 4,396,531, hot catalyst from the retention zone of an FCC regenerator supplies particulate catalyst to a heat exchanger for cooling the particulate catalyst by indirect contact with water and transfers the cooled catalyst to an FCC reactor. This reference shows the removal of cooled particulate material from the FCC regeneration zone.

U.S. Pat. No. 4,238,631 issued to Daviduk et al. shows a heat exchanger for cooling particulate catalyst from an FCC regenerator having a hot catalyst inlet in the middle of the heat exchanger vessel, a catalyst outlet at the bottom of the heat exchanger vessel for returning catalyst to the regenerator, and a conduit at the top of the exchanger for venting gas from the heat exchanger back to the regenerator. Cooling fluid conduits located below the catalyst inlet remove heat from the catalyst by indirect heat exchange therewith. This reference shows a particle inlet in a mid portion of a particle heat exchanger.

U.S. Pat. No. 2,735,802 issued to Jahnig depicts a particulate heat exchanger that receives particulate catalyst from an FCC regenerator through an inlet located at a mid portion of the heat exchanger. Catalyst is returned to the regenerator through an outlet located at the bottom of the heat exchanger and a conduit located at the top of the heat exchanger vents gases back to the regenerator. The exchanger has conduits above and below the catalyst inlet for circulating coolant. The inventory of catalyst particles in the heat exchanger is adjusted to vary the level of catalyst in the heat exchanger and in contact with the cooling conduits in order to vary the amount of heat removal. This reference shows a heat exchanger with heating and cooling conduits above and below a particle inlet.

SUMMARY OF THE INVENTION

This invention is a method of heating or cooling particulate material by indirect heat exchange of the particles with a heat exchange fluid in a heat exchanger having an upper flow through portion and a lower backmix portion. Using a backmix exchanger zone below a flow through exchanger zone provides additional surface for the cooling conduits and increases the total heat removal capacity of the exchanger. Operation of the exchanger is also simplified by this design since the heat removal capacity of the exchanger can be varied by regulating the amount of fluidizing gas or vapor that enters the backmix portion of the exchanger. The percentage of heat removal from the backmix portion can be increased to its maximum or reduced to zero by using fluidizing gas varying in amount from a maximum to none at all.

It is an object of this invention to increase the heat transfer capacity of particle heat exchangers.

It is a further object of this invention to provide a method of cooling particles and a particle heat exchanger having improved heat transfer capacity.

Another object of this invention is to provide a particle heat exchanger that is easily adapted to the configuration of the equipment supplying the particles.

A yet further object of this invention is to improve the method of regulating heat transfer in the indirect heat exchange of particles with a heat exchange fluid.

Accordingly, in one embodiment, this invention is a method for indirect heat exchange between fluidized particles and a heat exchange fluid. The method comprises collecting hot particles in a particle collection zone, at a first elevation, and transferring the particles by gravity flow through a particle inlet to the top of heat removal zone located at a second elevation below the first elevation. The particles are fluidized in a heat removal zone, at least in part, by introducing a fluidizing gas into the heat removal zone. Heat is removed from the particles in the heat removal zone by indirect heat exchange with the heat transfer fluid in a first section where the particles flow from the inlet to an outlet in a central portion of the heat removal zone and in a second section below the inlet and outlet wherein there is no net particle flow. Relatively cool particles are recovered from the heat removal zone through the particle outlet and pneumatically transported from the outlet to the first elevation.

In a further embodiment, this invention is a process for cooling hot fluidized catalyst. The method includes passing catalyst particles having coke deposited thereon to a combustion zone, passing an oxygen-containing gas into contact with the catalyst to oxidize the coke contained thereon, withdrawing hot catalyst from the regeneration zone, and passing the hot catalyst to a remote heat removal zone through a catalyst inlet. Relatively cool catalyst particles are recovered from the heat removal zone through a catalyst outlet. Heat is removed from the catalyst by indirect heat exchange with a cooling fluid in an upper section of the heat removal zone and a lower section of said heat removal zone. The upper section of the heat removal zone has a net flow of catalyst particles therethrough while the lower section of the heat removal zone has no net catalyst particle flow. The catalyst in the heat removal zone is fluidized by passage of a fluidizing gas therethrough.

In a yet further embodiment, this invention is directed to an apparatus for heating or cooling fluidized particles. In combination, the apparatus contains a vertically oriented elongated heat exchanger for indirectly contacting the particles with a heat transfer fluid, with the exchanger having upper and lower heat removal sections, a plurality of heat exchange tubes, each tube having a substantial surface area in each of said sections, and a particle inlet and particle outlet located at opposite ends of the upper heat removal section for admitting particles and withdrawing particles from said exchanger.

Other embodiments, details and arrangements of the present invention are described in the following detailed description.

DETAILED DESCRIPTION OF THE INVENTION

The present invention, in its process aspects, consists of steps for the heating or cooling of a fluidized particulate solid. The method and apparatus of this invention can be used for either the heating or cooling particles, however, for the sake of simplicity, the description will only make reference to particle cooling. An important application of the invention will be in a process for the combustion of a combustible material from fluidized solid particles containing the combustible material, including the step of introducing oxygen containing combustion gas and the fluidized solid particles into a combustion zone maintained at a temperature sufficient for oxidation of the combustible material. The combustible material will be oxidized therein to produce a dense phase fluidized bed of hot fluidized solid particles cooled by the process of this invention.

The above combustion zone may be in dilute phase with the hot particles transported to a disengaging zone wherein the hot particles are collected and maintained as the first mentioned bed, or the combustion zone may be in dense phase and in itself comprise the first bed.

In a particularly important embodiment of the invention, there will be included steps for the regenerative combustion within a regeneration zone of a coke containing FCC catalyst from a reaction zone to form hot flue gas and hot regenerated catalyst, disengagement and collection of the hot regenerated catalyst, cooling of the hot regenerated catalyst in a heat removal or, as more often referred to, cooling zone comprising the heat exchanger of this invention and the return of the cooled regenerated catalyst to the regeneration or reaction zone for control of the temperatures of the catalyst in the regeneration zone. For the purposes of an FCC process, the term "hot regenerated catalyst" means regenerated catalyst at the temperature leaving the combustion zone, from about 1300° to about 1400° F., while the term "cool regenerated catalyst" means regenerated catalyst at the temperature leaving the cooling zone, the latter of which is up to 200° F. less than the temperature of the hot regenerated catalyst.

Figure 1:
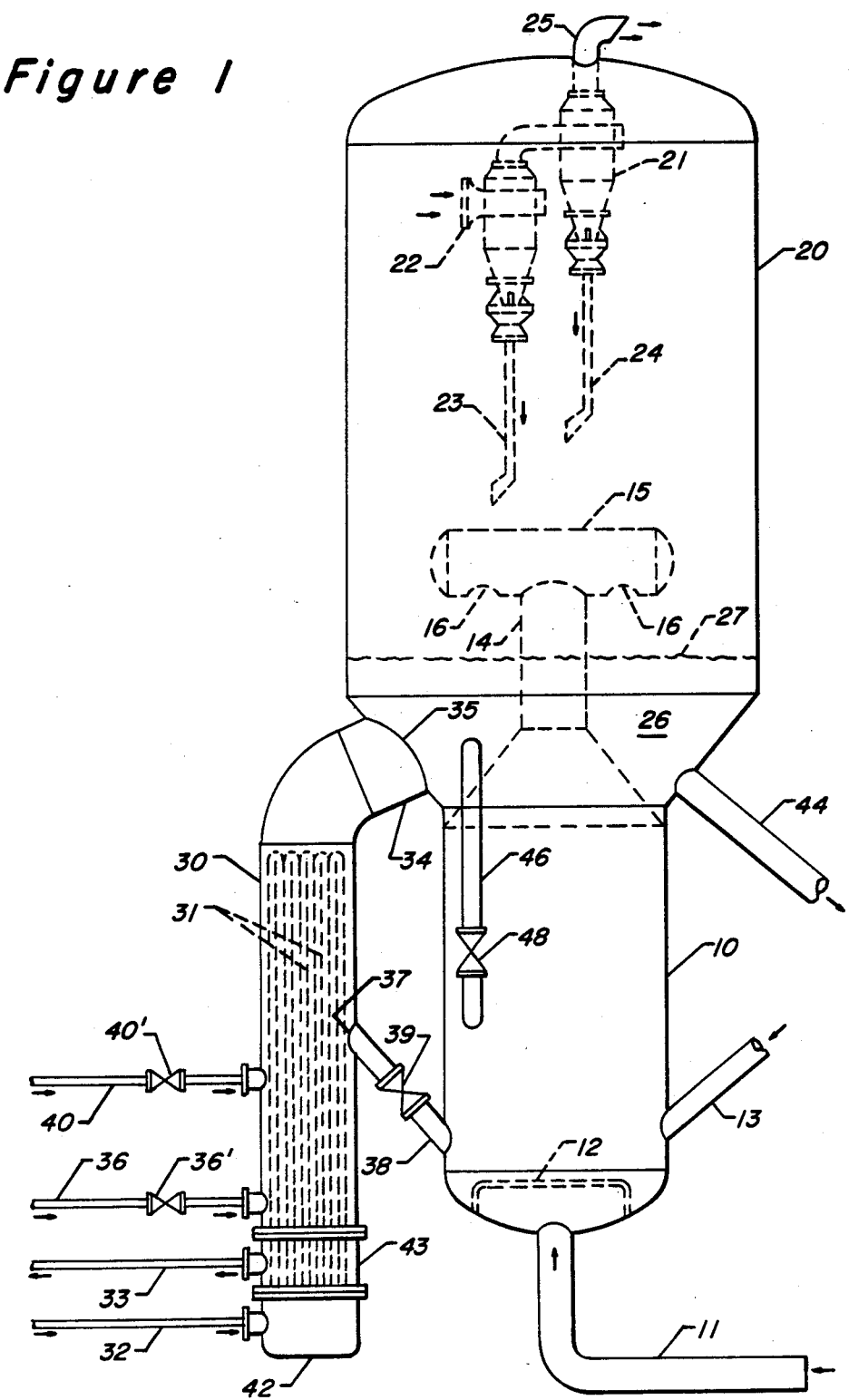
FIG. 1 is an elevation view of an FCC regenerator having a particle exchanger of this invention.

Reference will now be made to FIG. 1 for a discussion of the particle heat exchanger and the method of invention. In FIG. 1, regeneration gas, which may be air or another oxygen-containing gas, enters a combustion zone 10 through a line 11, and is distributed by a dome style distribution grid 12. Air leaving the grid mixes with coke contaminated catalyst particles entering the combustion zone through a conduit 13. These streams are shown as flowing separately into the combustor zone 10, however, each stream could flow together into a mixing conduit before entering combustion zone 10. Coke contaminated catalyst commonly contains from about 0.1 to about 5 wt. % carbon, as coke. Coke is predominantly comprised of carbon, however, it can contain from about 5 to about 15 wt. % hydrogen, as well as sulfur and other materials. The regeneration gas and entrained catalyst flows upward from the lower part of combustion zone 10 to the upper part thereof in dilute phase. The term "dilute phase", as used herein, shall mean a mixture of catalyst particles and gas having a density of less than 30 lbs/ft$^3$, and "dense phase" shall mean such mixture equal to or more than 30 lbs/ft$^3$. Dilute phase conditions, that is, a catalyst/gas mixture of less than 30 lbs/ft$^3$, and typically 2-10 lbs/ft$^3$, are the most efficient for coke oxidation. As the catalyst/gas mixture ascends within combustion zone 10, the heat of combustion of coke is liberated and absorbed by the now relatively carbon-free catalyst, in other words by the regenerated catalyst.

The rising catalyst/gas stream flows through a riser conduit 14 and impinges upon the top of a lateral conduit 15, which impingement changes the direction of flow of the stream and directs the catalyst and gas mixture through outlets 16. The impingement of the catalyst/gas stream upon surface 15 and the change of direction through outlets 16 causes most of the hot regenerated catalyst flowing from the combustion zone to disengage from the flue gas and fall to the bottom portion of disengagement zone 20 which comprises a hot particle collection chamber or fluid particle collection section. Although zone 20 is referred to as a disengaging zone, this term also embraces the possibility that additional regeneration or combustion may be carried out in this zone. The catalyst collection area of the disengagement zone may be an annular receptacle, as shown, or any other shape appropriate for collecting catalyst particles. Catalyst in the bottom of the collection zone is maintained as a dense bed 26 having an upper level 27. The gaseous products of coke oxidation and excess regeneration gas, or flue gas, and the uncollected portion of hot regenerated catalyst particles flow up through disengagement zone 20 and enter catalyst/gas separators such as cyclones 21 through an inlet 22. Catalyst particles separated from the flue gas falls from the cyclones to the bottom of disengagement zone 20 through dip legs 23 and 24. The flue gas exits disengagement zone 20 via conduit 25, through which it may proceed to associated energy recovery systems.

Hot catalyst particles are removed from the disengaging zone and transferred to an FCC reactor via a conduit 44 or returned to the combustion zone via conduit 46. A valve 48 regulates catalyst flow through conduit 46. Catalyst particles are also returned to the combustion zone following prior passage through a cooling zone.

With further reference to FIG. 1, the cooling zone is comprised of a heat exchanger 30 having a vertical orientation with the catalyst in the shell side and the heat exchange medium, supplied and recovered by lines 32 and 33, passing through a tube bundle 31. The preferred heat exchange medium would be water, which, in further preference, would change only partially from liquid to gas phase (steam) when passing through the tubes. It is also preferable to operate the heat exchanger so that the exchange medium is circulated through the tubes at a constant rate. The tube bundle in the heat exchanger will preferably be of the "bayonet" type wherein one end of the bundle is unattached, thereby minimizing problems due to the expansion and contraction of the tubes when exposed to and removed from the high regenerated catalyst temperatures. The heat transfer that occurs is, from the catalyst, through the tube walls, and into the heat transfer medium. The upper portion of heat exchanger 30 is in sealed communication with the bottom portion of the disengagement zone through a conduit portion 34 and an inlet 35 which serves as a withdrawal point for removing catalyst from dense bed 26. Cool catalyst is withdrawn from a mid-portion of exchanger 30 and returned to the combustion zone 10. Catalyst is withdrawn from the mid-portion through an outlet 37 and delivered to a conduit 38 having a flow control valve 39. Valve 39 regulates catalyst particle flow out of conduit 38. That portion of the heat exchanger bounded by inlet 35 and outlet 37 is referred to as the flow through portion and operates with a net flow of catalyst through this portion. The portion of the heat exchanger below outlet 37 is termed the backmix portion. The lower or backmix portion of the exchanger will have at least 10% of the heat removal capacity of the exchanger and preferably will have a heat removal equal to at least 25% of the total heat removal capacity of the exchanger.

Fluidizing gas, preferably air, is passed into a lower portion of the shell side of heat exchanger 30 via lines 36 and 40, thereby maintaining a dense phase fluidized particle bed in the shell side. Lines 36 and 40 have valves 36' and 40' respectively positioned thereacross to regulate the flow of fluidizing gas. The fluidizing gas effects turbulent backmixing in the backmix portion of the heat exchanger and allows catalyst particle transport through the flow through portion of the exchanger. It is only necessary to add fluidizing gas to the exchanger through lower fluidizing gas line 36. As fluidizing gas flows upward, it effects the necessary backmixing for heat transfer in the backmix portion of the heat exchanger and as it passes into the flow through portion of the heat exchanger, provides fluidization for catalyst particle transport. Heat removal, or in other words heat exchanger duty, can also be controlled by adjusting the flow rate of gas addition through line 36. A higher flow rate will increase heat transfer and raise the exchanger duty. Although it is only necessary to add the fluidizing gas to the bottom of the heat exchanger, fluidizing gas may be added at any number of locations. Adding fluidizing gas at the locations as shown in FIG. 1, allows independent control of exchanger duty in the backmix portion. A minimum amount of fluidizing gas is always needed to maintain good catalyst transport through the flow through portion of the cooler. Line 40 can be used to supply all or a portion of this minimum fluidizing gas when heat removal demands require little or no duty from the backmix portion of the exchanger. This permits the flow of fluidizing gas through line 36 to be regulated to zero, if necessary, however, a minimal amount of fluidizing equal to less than 5% of the total will be added through the bottom nozzle whenever the exchanger is in operation.

The tube bundle shown in the exchanger is of the aforementioned bayonet type in which all of the tubes are attached to a single tube sheet located at the bottom of the heat exchanger. A typical configuration of tubes in the bayonet-type bundle would be one inch tubes each ascending from an inlet manifold 42 in the head of the exchanger up into the shell through a three inch tube sealed at its top. Each one inch tube empties into the three inch tube in which it is contained just below the sealed end of the three inch tube. A liquid, such as water, would be passed up into the one inch tubes, would empty into the three inch tubes, would absorb heat from the hot catalyst through the wall of the three inch tubes as it passed downward through the annular space of the three inch tubes and would exit the heat exchanger, at least partially vaporized, from outlet manifold 43. It is important in the FCC process that the quantity of hot particles which enter heat exchanger 30 be sufficient to maintain a depth of dense phase fluid catalyst bed which substantially submerges the tubes in the dense phase bed. Submersion of tubes prevents overheating of tubes when circulation o cooling fluid is temporarily interrupted. Overheating poses problems when the tubes are made of carbon steel or other low metallurgy.

The flow through portion of the exchanger is used to transfer cooled catalyst particles from the exchanger to the combustion zone. Cooled catalyst entering the combustion zone effects an overall temperature reduction throughout the combustion and disengagement zone. The flow through type of operation is characterized by large heat transfer rates that achieve a high degree of catalyst cooling.

The backmix portion of the exchanger further reduces the temperature of the catalyst once it has passed through the flow through portion. It is known that backmixing can be obtained within the heat exchanger at reasonable superficial gas velocities that will circulate catalyst down the length of the backmix portion. The fluidizing gas addition affects the heat transfer coefficient directly by affecting the superficial velocity over the heat exchanger tubes and indirectly by influencing the extent of mass flow of catalyst through the backmix portion of the heat exchanger. The higher mass flow will also result in a higher heat exchanger duty because the average catalyst temperature in the backmix portion will be higher thereby providing a higher temperature difference to which the amount of heat transfer is directly proportional. Additional details on the operation of a backmix cooling zone can be found in U.S. Pat. No. 4,439,533.

The use of a lower backmix and an upper flow through portion allow the heat exchanger to retain a simple design and have a longer length than could not have been obtained with either type of heat exchanger alone. If a flow through type heat exchanger having gravity feed of particles were used, the length of the exchanger would be limited by the height between the catalyst withdrawal point 35 and the outlet 37. Although there is enough overall height to use a backmix type cooler having the length shown in FIG. 1, the backmix circulation of catalyst over such a long length would require excessive amounts of fluidization gas and, in addition, would have low overall heat transfer performance.

Figure 2:
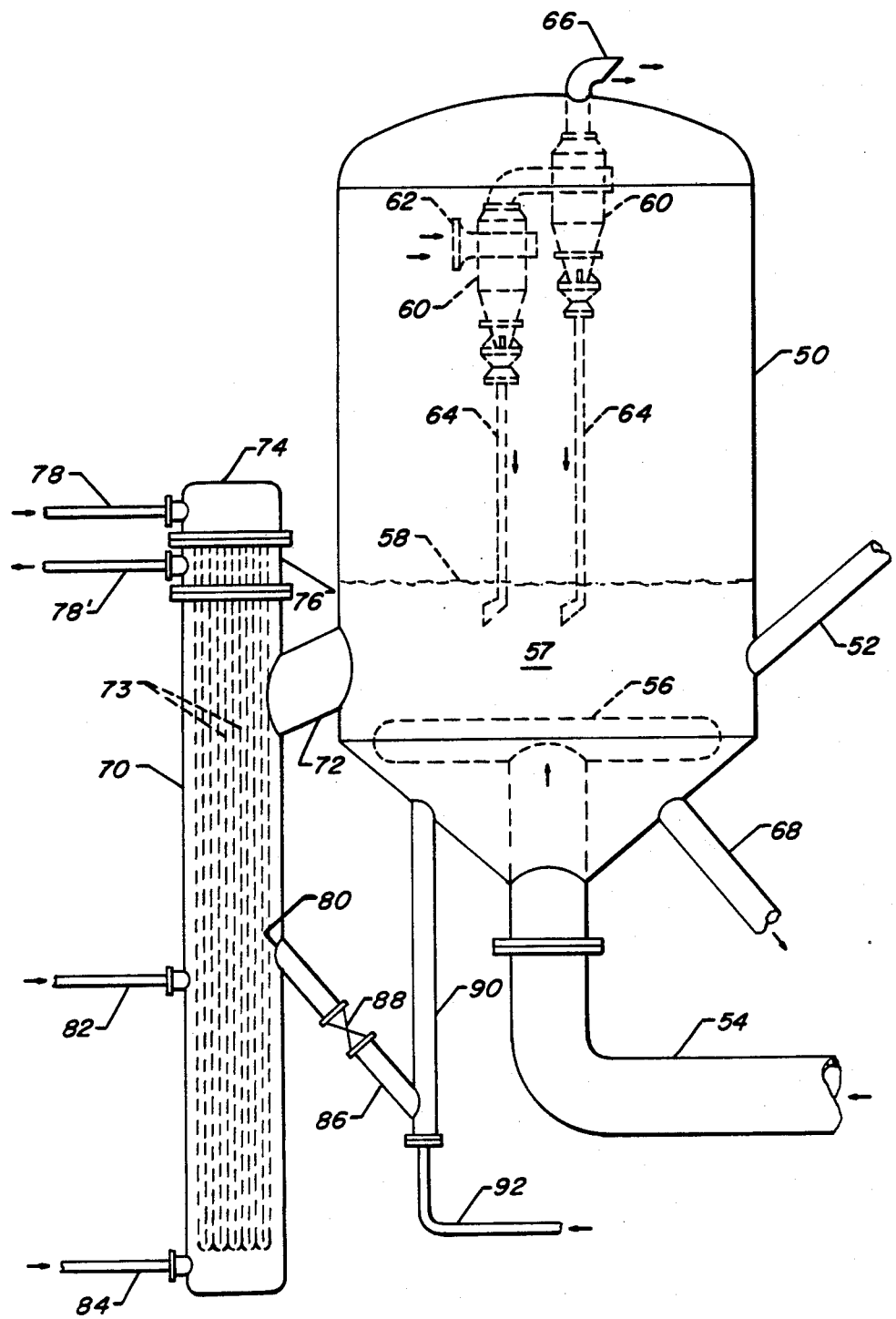
FIG. 2 shows an elevation view of a different form of FCC regenerator having a modified form of the exchanger of this invention.

FIG. 2 shows the particle heat exchanger of this invention in combination with a different type of FCC regenerator. The regenerator has a single chamber in a vessel 50. Spent catalyst containing coke in an amount of from 0.1 to 5 wt. % enters the regenerator through a conduit 52. A lower conduit 54 delivers air to the regenerator which is distributed across the transverse cross-section of the vessel 50 by a distributor 56. Passage of the air through the catalyst oxidizes coke from the surface of the catalyst and maintains the catalyst as a dense fluidized bed 57 having a level 58. Regeneration gas and any catalyst entrained therein is carried upward and enters the cyclones through inlet 62. Cyclone dip legs 64 return catalyst particles to bed 57. A nozzle 66 carries the regeneration gas from cyclones 60 and out vessel 50. Regenerated catalyst having a reduced coke concentration exits a lower portion of vessel 50 through a conduit 68 and reenters a reaction zone (not shown).

A heat exchanger 70 communicates with catalyst bed 57 through a conduit 72. Heat exchanger 70 operates in substantially the same manner as exchanger 30 shown in FIG. 1 and differs mainly in the orientation of the bayonet tubes and the means and method of returning catalyst to the regenerator. Exchanger 70 has a plurality of bayonet tubes 73 consisting of an inner tube that receives a heat exchange medium from an inlet manifold 74 and an outer closed end tube that returns the heat exchange medium to an outlet manifold 76. Lines 78 and 78' supply and remove the heat exchange medium from the cooler 70. An outlet 80, located in a mid-portion of the exchanger carries cool catalyst particles out of the exchanger and divides the exchanger into an upper portion that operates in a flow through mode and a lower portion that operates in a backmix mode. Fluidization gas can enter the exchanger through either or both of two fluidizing gas inlets 82 and 84 located respectively just below outlet 70 and at the bottom of the exchanger. A conduit 86 takes cool catalyst from the outlet 80 at a rate regulated by a control valve 88. Cool catalyst flows out of conduit 86 in an external riser 90. A line 92 admits fluidization gas into riser 90 which contacts the relatively cool catalyst and transports it back into the dense bed 57.

The heat exchanger of this invention is especially useful in FCC arrangements of the type shown in FIG. 2. In these arrangements, the horizontal portion of line 92 lies very close to the ground elevation. Therefore, the length of the flow through type cooler cannot be increased without raising the entire regeneration vessel 50. This invention increases the length and corresponding heat transfer area of the cooler without raising the elevation of the entire vessel by utilizing space below the exchanger outlet and ground that would otherwise be unused. Locating the inlet and outlet manifolds at the top of the cooler facilities removal of the tube bundle by permitting it to be lifted from the top of the exchanger The following example demonstrates the advantages of using the exchanger of this invention to reduce the temperature of catalyst entering the reaction zone when processing a moderately heavy FCC feed. These examples are based, in part, on engineering calculations and commercial experience with similar operating units. The feed in this example is a blend of vacuum gas oil and residual oil having the properties set forth in Table 1.

TABLE 1

| | |
|---|---|
| GRAVITY, °API | 26.2 |
| SULFUR, WT. % | 1.2 |
| CONRADSON CARBON, WT. % | 1.74 |
| NICKEL WT. - PPM | 1 |
| VANADIUM WT. - PPM | 2 |
| VOL % AT 1050° F. | 10 |

EXAMPLE

In this example the FCC feed was processed in an FCC reactorregenerator having an FCC riser reaction zone at process conditions summarized in Table 2. This example used a particle heat exchanger designed in accordance with this invention in an FCC unit of the configuration of FIG. 1. The exchanger had a surface area of 975 square feet in the backmix portion and 975 square feet in the flow through portion. Fluidization gas was added only at the bottom of the exchanger at a rate of 166,000 standard cubic feet per hour. Yield results for the feed conversion and conditions at selected locations of the process unit are given in Table 2.

TABLE 2

| PROCESS CONDITIONS | |
|---|---|
| SPENT CATALYST TO COMBUSTOR TEMP., °F. | 1000 |
| REGENERATED CATALYST TO REACTOR TEMP., °F. | 1332 |
| CATALYST TEMP. AT COOLER INLET, °F. | 1332 |
| CATALYST TEMP. AT COOLER OUTLET, °F. | 1132 |
| COOLER DUTY IN BACK MIX PORTION COOLER $10^6$ BTU/HR. | 17 |
| DUTY IN FLOW THROUGH PORTION, $10^6$ BTU/HR. | 33 |
| CATALYST ADDITION, #/BBL | 0.27 |
| YIELDS | |
| $C_2$-WT. % | 4.24 |
| $C_3$ LV. % | 11.83 |
| $C_4$ LV. % | 15.35 |
| $C_5$-GASOLINE LV. % | 59.51 |
| LCO LV. % | 13.69 |
| CO LV. % | 7.78 |
| COKE WT. % | 5.82 |
| TOTAL LV. % | 108.15 |

The FCC embodiments illustrated by the Figures and the Example is only one possible application of the present invention which in its broadcast sense is a process for heating or cooling fluidized particles for any purpose. The apparatus aspect of the present invention in its broadest sense, as summarized above, may also be identified in the Figures.

What is claimed is:

1. A method for indirect heat exchange between fluidized particles and a heat exchange fluid comprising:
   (a) collecting hot particles in a particle collection zone at a first elevation;
   (b) transferring said particles through a particle inlet by gravity flow to the top of a heat removal zone located at a second elevation below said first elevation;
   (c) fluidizing the particles in said heat removal, at least in part, by introducing a fluidizing gas into said heat removal zone;
   (d) removing heat from the particles in said heat removal zone by indirect heat exchange with a heat transfer fluid in a first section where particles flow from the inlet to an outlet located in a central portion of said heat removal zone and a second section below the inlet and outlet having no net particle flow; and,
   (e) recovering relatively cool particles from said heat removal zone through said outlet and pneumatically transporting said particles from said outlet to said first elevation.

2. The process of claim 1 wherein less than 5% of said fluidizing gas entering said heat removal zone is added to said second section when the quantity of heat removed by said heat removal zone is low relative to tis total heat removal capacity.

3. The process of claim 1 wherein the heat removal capacity of said second section has at least 25% of the heat removal capacity of said first section.

* * * * *